US007107983B1

(12) United States Patent
West

(10) Patent No.: US 7,107,983 B1
(45) Date of Patent: Sep. 19, 2006

(54) PORTABLE STOVE

(76) Inventor: Jeffrey C. West, 5226 Danfield Dr., Columbia, SC (US) 29204

( * ) Notice: Subject to any disclaimer, the term of this patent is extended or adjusted under 35 U.S.C. 154(b) by 0 days.

(21) Appl. No.: 11/059,904

(22) Filed: Feb. 17, 2005

Related U.S. Application Data

(63) Continuation-in-part of application No. 10/783,050, filed on Feb. 20, 2004, now abandoned.

(51) Int. Cl.
*A47J 37/00* (2006.01)
*A47J 37/07* (2006.01)

(52) U.S. Cl. .................... 126/25 R; 126/9 R; 126/9 B

(58) Field of Classification Search ............. 126/25 R, 126/29, 30, 9 R, 9 B, 65
See application file for complete search history.

(56) References Cited

U.S. PATENT DOCUMENTS

| 983 | A | * | 10/1838 | Mott | .......................... 126/25 R |
|---|---|---|---|---|---|
| 206,422 | A | * | 7/1878 | Collier | ........................ 126/9 R |
| 936,482 | A | * | 10/1909 | Seeley | .......................... 126/43 |
| 1,298,762 | A | * | 4/1919 | Milligan | .................... 126/25 R |
| 3,384,066 | A | * | 5/1968 | Tufts | ............................ 126/9 R |
| 5,842,463 | A | * | 12/1998 | Hall | ............................ 126/9 R |
| 6,520,173 | B1 | | 2/2003 | Lautner | |

OTHER PUBLICATIONS

"Engineering" the Perfect Christmas web page found at http://www.americanengineeringcampaign.org/pressroom/christmas.html on Mar. 28, 2004.

Stainless Steel web page found at http://en.wikipedia.org/wiki/Stainless_steel on Mar. 28, 2004.

My New Oven Doesn't Cook Evenly! web page found at http://repair2000.com/nocook/html on Mar. 28, 2004.

Ranges & Cooking web page found at http://www.Appliance.com on Mar. 28, 2004.

Technical Facts/Technical Tips & Case Studies web page found at GE Polymerland—Tech Tip: K-Thermal Conductivity on Mar. 28, 2004.

Heat Transfer Fundamentals web page found at http://www.parker.com/chomerics/tech/heattransfer.html on Mar. 28, 2004.

(Continued)

*Primary Examiner*—Alfred Basichas
(74) *Attorney, Agent, or Firm*—Michael A. Mann; Nexsen Pruet, LLC

(57) ABSTRACT

A portable stove includes a frusto-conical body and a grid carried within the body together with an optional cooking surface for the smaller end of the body and stands to elevate the larger end of the body to facilitate establishing an air flow into the body. By rolling a flat piece of metal that has folds on both ends until the folded ends are interlocked, the stove's body is formed. Squeezing the formed body releases it to return to a flattened configuration for storage. The components of the stove can thus be stored in a compact configuration such as in a backpack. An optional oven includes a cooking chamber within a housing. The oven rests on the body and redistributes heat from the burning fuel inside the body to the cooking chamber base, body and lid so that it bakes evenly. The housing confines the heat to the chamber for improved cooking efficiency.

19 Claims, 7 Drawing Sheets

OTHER PUBLICATIONS

Heat Transfer web page found at http://physics/bu.edu/py105/notes/Heattransfer.html on Dec. 4, 1998.

In the mix web page found at http://www.faia.org.uk/flavour.php on Jan. 27, 2004.

The Sugar Association web page found at http://www.sugar.org/kitchen/bakery.html on Jan. 27, 2004.

The Science of Toasting web page found at http:www.invisibleplanet.pwp/blueyonder.co.uk/toast/science.html on Jan. 27, 2004.

A Question of Freshness web page found at http://www.blackbearcoffee.com/question_of_freshness.html on Jan. 27, 2004.

* cited by examiner

PORTABLE STOVE

CROSS REFERENCE TO RELATED APPLICATIONS

The present application is a contination in part of application Ser. No. 10/783,050, filed Feb. 20, 2004 now abandoned.

BACKGROUND OF THE INVENTION

The present invention relates generally to portable stoves and ovens for cooking using available combustible solid fuels.

Many people throughout the world use electric or gas ovens, microwave ovens and stovetops for cooking. However, many more do not. Stoves and ovens that use wood, propane, charcoal, peat, dung, or chemical combustibles are often used out of convenience or necessity. For example, those hiking long distances may build campfires for cooking and for warmth. Campers may include small portable propane stoves specifically for camping among their camping gear.

Not everyone has a choice in the way to cook. Many people in underdeveloped countries cook in primitive ways, perhaps using campfires or simple structures in which to burn whatever solid fuels are available. Many times these primitive heat sources are inefficient, consuming a lot of fuel for the amount of cooking actually being done.

However, even when the most modern cooking appliances are available, the results are not always optimal. The taste of food is often better when the right combinations of browning and residual moisture content are obtained. Those combinations do not always result from the use of the most modern cooking appliances.

Thus their remains a need for a better way to cook, particularly for those who do not have access to conventional stoves, ovens, microwave ovens and the like, whether by choice or not, and preferably a way to cook that is more energy efficient and also, ideally, more easily portable.

SUMMARY OF THE INVENTION

According to its major aspects and briefly recited, the present invention is a portable stove. The present stove in all embodiments is a small stove for simple outdoor cooking and, in one embodiment, baking.

An important feature of the present invention is that the stove disassembles without tools into a series of flat components that can be stored or carried easily with minimal space requirements.

Another important feature of the present invention is that it is preferably made to have a frusto-conical shape that has two advantages. This shape is very stable and is more energy efficient. The present stove also has a cooking surface that takes the heat, concentrated by the frusto-conical shape, and delivers it to the food-holding container placed on the surface, thereby avoiding wasted heat thrown to the sides of the container.

Still another important feature of the present invention is the use of copper to transmit heat in a controlled manner. The heat follows copper readily, more so than many other metals, delivering it to where it is desired and thus wasting less heat.

Another feature of the present invention is an oven that surrounds a baking chamber with heat from the stove below it and thus bakes with surprisingly good results.

Other features and their advantages will be apparent to those skilled in the art of lamp design from a careful reading of a Detailed Description Of The Invention accompanied by the following drawings.

DETAILED DESCRIPTION OF THE INVENTION

Figure 1:
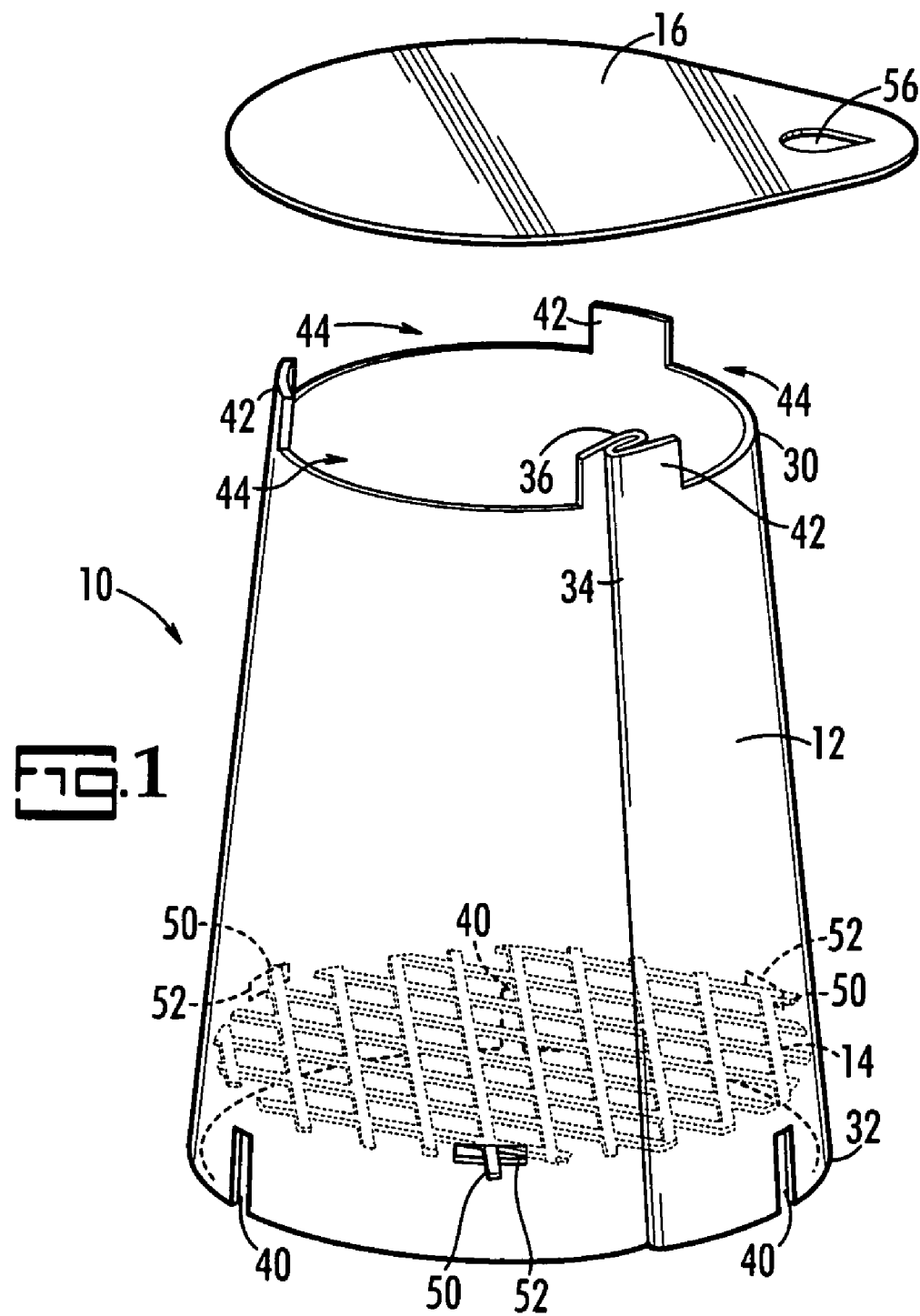
FIG. 1 is a perspective, partially exploded view of a stove according to a first preferred embodiment of the present invention.

The present invention is a device for cooking, that is, for serving as a heat source for food and beverages, which device will be referred to simply as a stove. The present stove can heat the bottom of a container of food in the same fashion as a stovetop does or, in an alternative embodiment, it can surround a food item, in a container or otherwise, with heat in order to bake the item, as in an oven. It has a secondary function as serving as a heat source for individuals.

Referring now to FIGS. 1–4, the present stove, generally referred to with reference number 10, includes a body 12 and a fuel support grid 14. It may also include a cook surface 16 and stands 18. Stands 18 may have slits 24 formed in them to receive body 12.

Body 12 is generally cylindrical in shape but is preferably slightly frusto-conical in shape so that the diameter of its top 30 is smaller than the diameter of its bottom 32 in order to concentrate heat and be more stable. Body 12 is made of a single piece of sheet metal with complementary folds 34, 36 at opposing edges that can be interleaved for body 12 to define and hold the cylindrical or frusto-conical shape but also to allow it to be unfolded flat when it is to be stored, perhaps slightly curved inside a backpack. The term cylindrical will be used herein to include frusto-conical unless the latter term is specifically used.

It is important to allow air to flow into body 12 and out of body 12. Air flowing in brings oxygen for combustion; air flowing out takes exhaust gases with it. Accordingly, body 12 can have small cutout portions 40 at bottom 32 (FIG. 1) for mating with stands 18 to elevate stove 10 above a surface on which it is placed. Correspondingly, upstanding tabs 42 at top 30 define openings 44 through which exhaust gases may exit body 12 at top 30.

Figure 2:
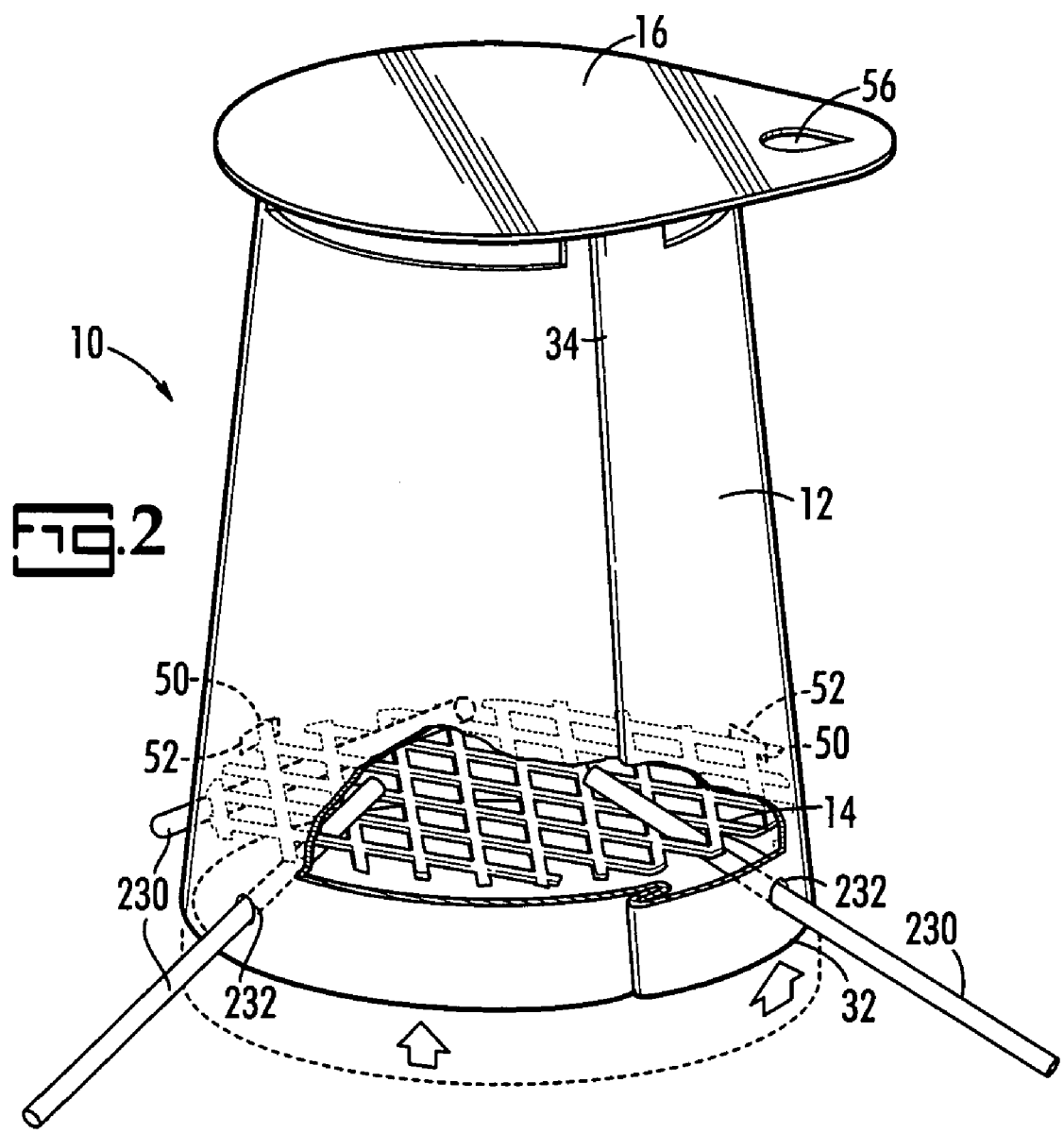
FIG. 2 is a perspective, partially cut-away view of a stove according to an alternative preferred embodiment of the present invention.
Figure 3:
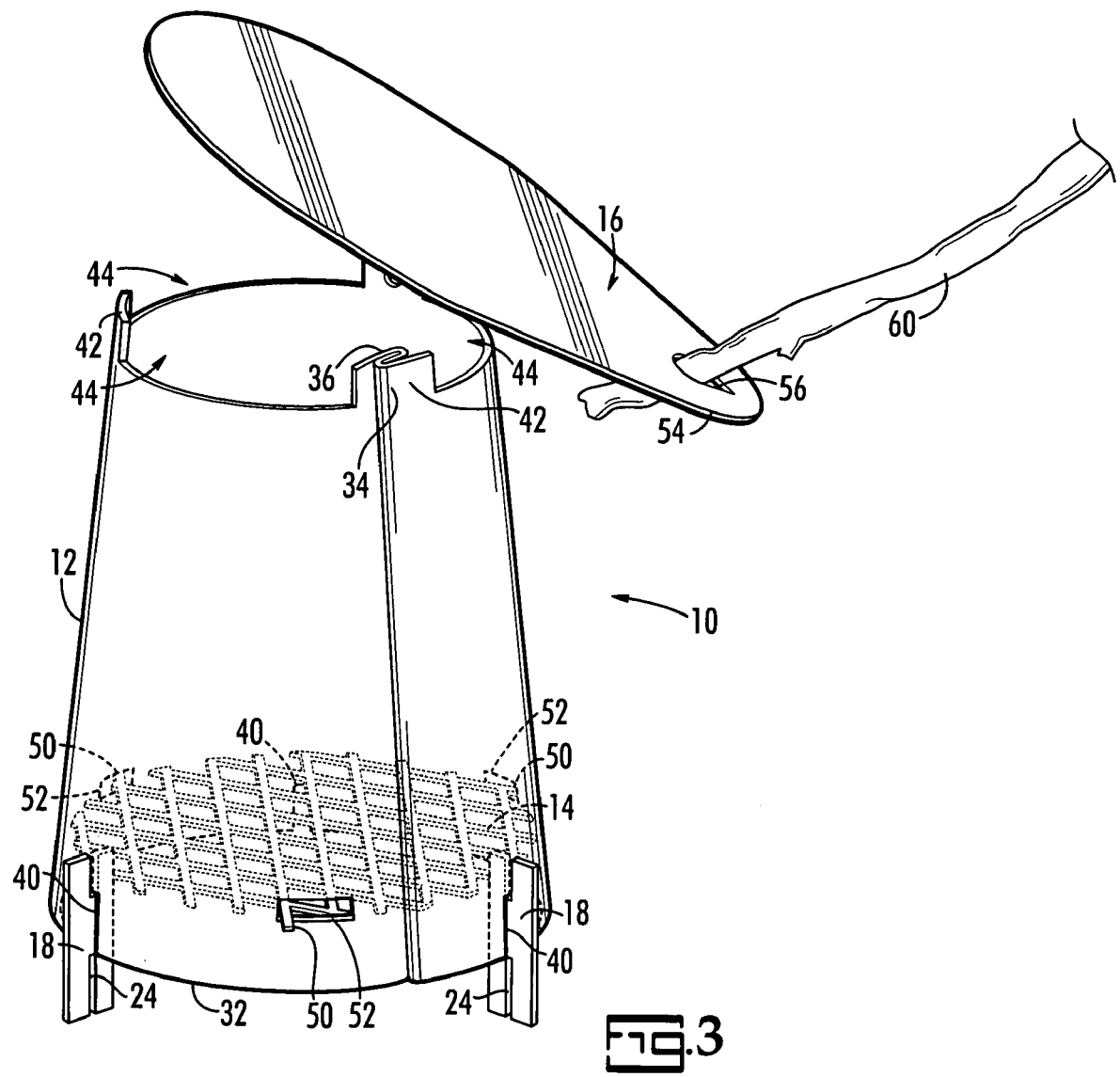
FIG. 3 is a perspective view of a stove according to a first preferred embodiment with alternative stands.

FIG. 2 shows an alternative method, to that shown in FIG. 1, for elevating body 12 in order to admit air for combustion. Base support rods 230 may be inserted through holes 232 formed in body 12 just below fuel support grid 14. One end of rods 230 extends into body 12 and through holes in grid 14; the other remains outside body 12 and acts as a leg for standing body 12 above the ground. All of the rods 230 may be moved inward as desired to adjust the height of the stove and thus adjust the draft and rate of combustion. Additionally, if used on a slope, some of the rods may be moved inward to keep the stove and cooking utensil level.

Fuel support grid 14 is a disk with plural holes formed therein, preferably a circular disk of expanded metal. Grid 14 has extensions 50 at several locations around its periphery that extend through holes 52 in body 12, when extensions 50 are brought into registration with holes 52, for supporting grid 14 at a distance above bottom 32 of body 12. Grid 14 is adapted to hold fuel while permitting air to flow up into the bottom opening of body 12, through grid 14 and the fuel, and out the top opening of body 12, thereby admitting air and creating a draft within body 12 to facilitate combustion. The frusto-conical shape of body 12 also facilitates the establishment of a draft by forcing the acceleration of the heated air upwards from cutout portions 40 or the spaces between stands 18 at bottom 32 upwards within body 12 to exit at openings 44 a top 30. Holes 52 may be round or rectangular and should be sized to make it easy to put extensions 50 through them as body 12 is curled around grid 14 during assembly and squeezed to release interlocking folds 34, 36. Also, extensions 50 and holes 52 are preferably deployed about body 12 to provide stable support for grid 14, most preferably three extensions 50 and three holes 52 at approximately 120 degree intervals are sufficient.

Cook surface 16 is preferably made of copper or other metal or metal alloy that quickly and readily conducts heat, and has an extended portion 54 along its periphery to facilitate lifting. Preferably extended portion 54 has a hole 56 formed near an edge that can be used in combination with a tool or stick 60 to lift cook surface 16 when it is hot.

Figure 4:
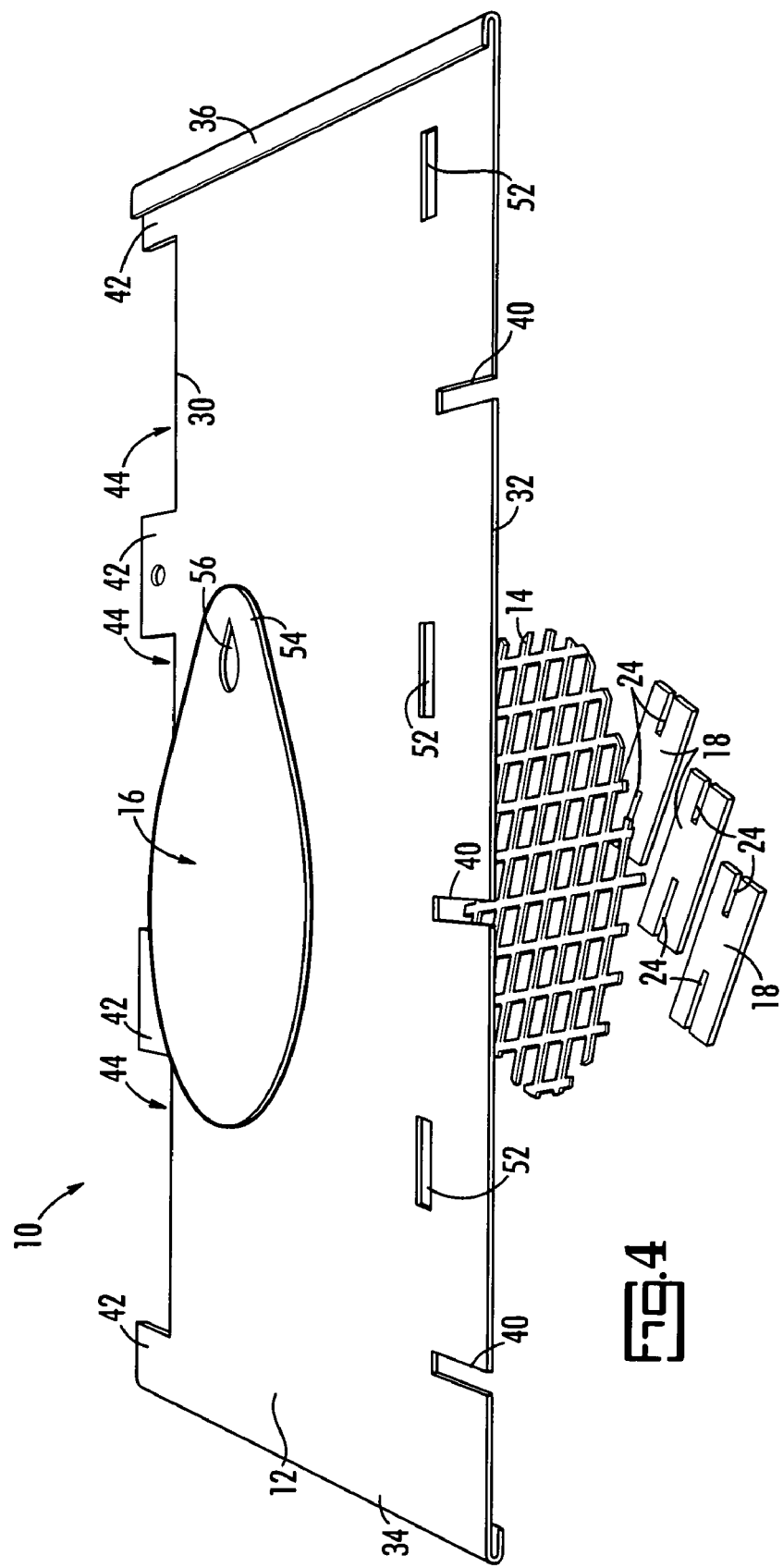
FIG. 4 is a perspective view of the stove of FIG. 3 shown disassembled, according to the first alternative embodiment of the present invention.

Note from the illustration in FIG. 4 that the components of the present stove 10 can be disassembled without tools and laid flat. Grid 14, cook surface 16, and stands 18 are already flat. Body 12 cools quickly because it is made of metal and can be easily squeezed to release interleaved folds 34, 36. Once folds 34, 36 are released, body 12 can be unrolled from its cylindrical or frusto-conical shape and placed flat. Alternatively, body 12 can be inserted in a backpack so that it follows the curve of the backpack's sides. Grid 14, cooking surface 16, and stands 18 can be placed in a plastic bag and carried easily in a backpack or one of its pockets. Note that cook surface 16 prevents soot deposits on cooking utensils and it and the other components of the present stove 10 can easily be wiped clean with a damp cloth.

Figure 5:
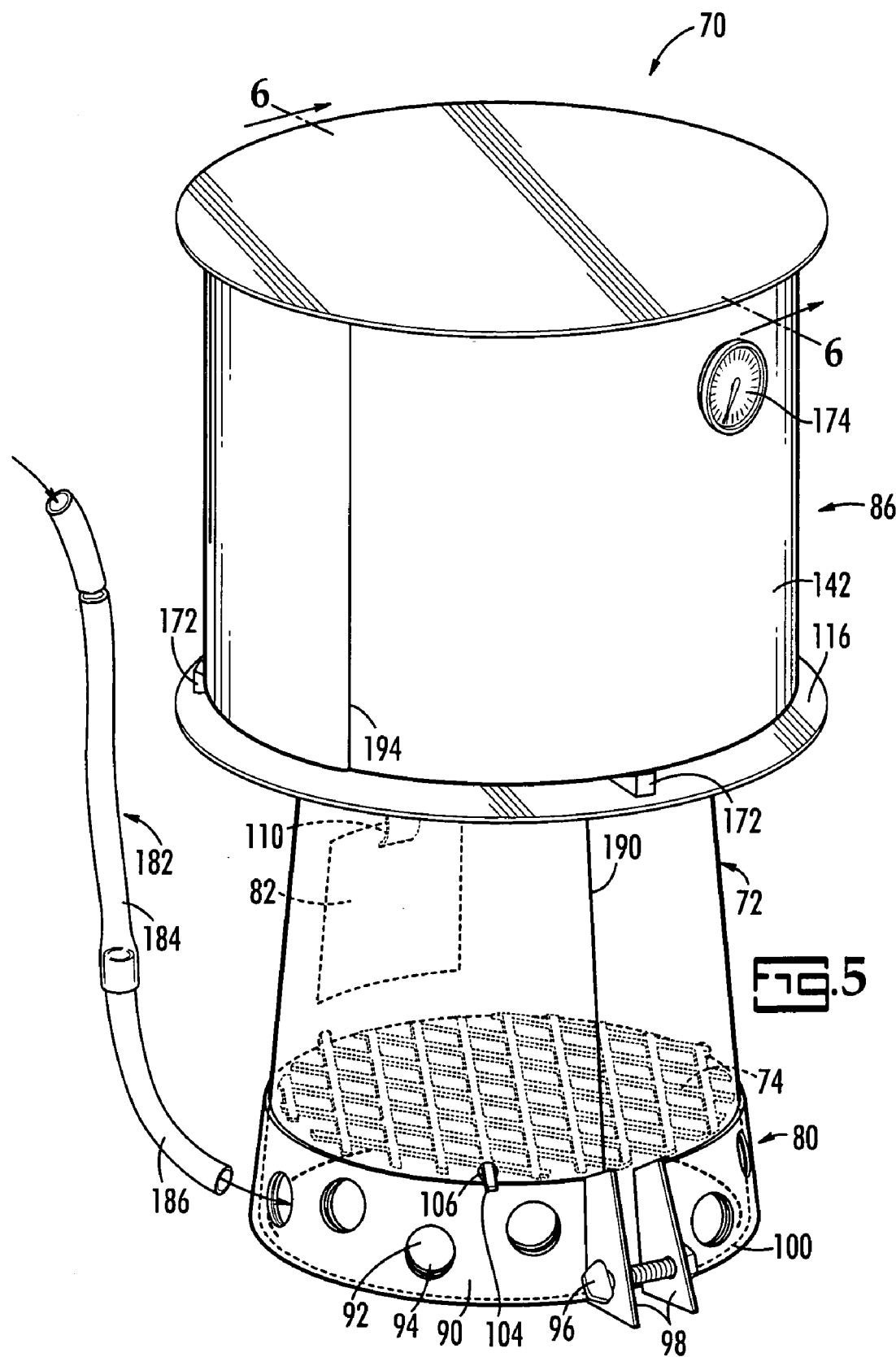
FIG. 5 is a perspective view of an alternative stove according to a second preferred embodiment of the present invention.
Figure 6:
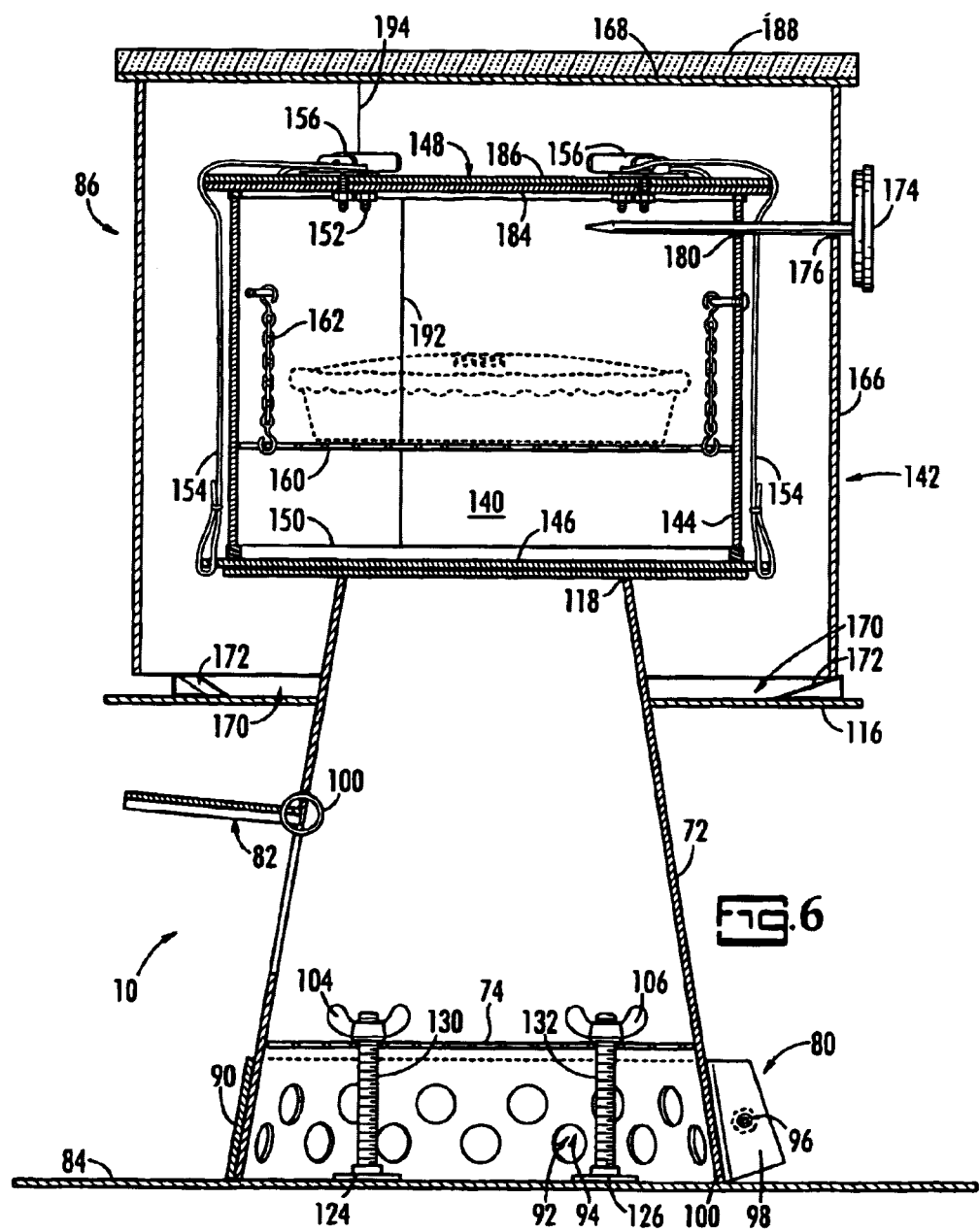
FIG. 6 is a cross sectional side view of the alternative stove shown in FIG. 5.

FIG. 5 and FIG. 6 illustrate another embodiment of the present invention. In this embodiment, there is a stove 70 having a body 72 and a grid 74 that function in the same manner as stove 10 with its body 12 and grid 14. Other than being dimensioned to be somewhat larger, the primary differences are a lower air-controller 80, a fuel hatch 82, a base 84, and an optional oven 86.

Lower air-controller 80 is a collar 90 with a series of holes 92 formed therein. A series of holes 94 are also formed in body 72. Holes 92 can be brought into and out of registration with holes 94 to increase or decrease the flow of air into the interior of body 72. Collar 90 is made to be easily rotatable coaxially with body 72 but can be secured by tightening a bolt 96 running through flanges 98 at the end of collar 90, thereby pulling flanges 98 together and tightening collar 90 to body 72. Collar 90 is preferably dimensioned to be below grid 74 and near bottom 100 of body 72.

Fuel hatch 82 is intended to allow the user to add fuel after setup. Hatch 82 is preferably hinged to body 72 in such a way that it can be lifted to an open position or lowered to a closed position easily. Most preferably, when lifted, the top edge of hatch 82 pivots about a ring hinge 110 and can be inserted partially into the hatch opening where it will remain in the lifted position against body 72 until lowered. Fuel hatch 82 is of course preferably located above grid 74 in the side of body 72.

Above fuel hatch 82 is a support surface 116 that is a flat, disk-shaped piece of sheet metal having a hole formed therein large enough so that it slips over a top 118 of body 72 and comes to rest on the exterior of body 72 several inches from top 118. Support surface 116 acts to support oven 86, as will be described below.

Base 84 has two threaded fittings 124, 126 that receive centering bolts 130, 132. Bolts 130, 132 are threaded to threaded fittings 124, 126. Then grid 74 is secured to centering bolts 130, 132 using nuts 104, 106. Body 72 can be fitted over grid 74 and the remaining components placed thereon.

Oven 86 includes a baking chamber 140 and a baking housing 142. Baking chamber 140 fits within housing 142, which creates a heated environment surrounding baking chamber 140. Baking chamber 140 includes a cylindrical body 144, base 146 and lid 148. Helping to seal base 146 to body 144 and body 144 to lid 148 are gaskets 150 and 152, respectively. These are preferably made of copper channel metal but may be made of any other heat conducting, flexible material. Once body 144 is placed on base 146, base 146 is secured to lid 148 using thin cables 154 and latches 156 that pivot to pull cables 154 tight and hold baking chamber 140 together. Inside baking chamber is a cooking rack 160 held in place preferably by chains 162 secured to body 144 using bolts 164. Chains 162 allow cooking rack to be adjusted vertically to the proper position within baking chamber 140. Food items such as breads, pies, cakes, casseroles, chickens and potatoes can be baked on rack 160 within baking chamber 140. The height of rack 160 is preferably set so that the top of the food item is an inch or so below lid 148.

Except for lid 148, baking chamber 140 is preferably made entirely of copper or other metal or metal alloy that conducts heat readily so that heat received from the combustion of fuels on grid 74 is transmitted to base 146 and thence to body 144 and to top 148 quickly so that body 144, base 146 and top 148 radiate heat evenly into the interior of baking chamber 140. Lid 148 has preferably two layers: a copper lower layer 184 and a stainless steel upper layer 186. This combination helps to prevent warping of lid 148 as a result of prolonged exposure to heat.

Housing 142, preferably made of stainless steel or other alloy that conducts heat less readily than copper or other metal baking chamber 140 is made of will tend to hold heat in and surround baking chamber 140 with heat. Housing 142 rests on support surface 116 and includes only a body 166 and a lid 168. Support surface 116 has a hole dimensioned to receive a portion of body 166 so that body 166 extends into housing 142. Preferably lid 168 has a layer for heat insulation 188 on top of it. Smoke and other exhaust gases can circulate within housing 142 (but not enter baking chamber 140) and exit from a gap 170 between support surface 116 and body 166. Preferably wedges 172 can be used to enlarge gap 170.

A thermometer 174 is important to use, as baking requires a reasonable degree of control over the temperature inside baking chamber 140. Thermometer 174 extends from outside housing 142 through a first hole 176 formed therein into baking chamber 140 through a second hole 180 formed therein.

Without wishing to be bound by theory, it is believed that the present baking chamber 140 promotes browning without excessive moisture loss. Browning, while nominally improving the appearance of food, also contributes to the flavor of food, particularly baked products. The Maillard reaction, in which amino groups of amino acids, peptides and proteins react with the glycosidic hydroxyl groups of sugars to form brown pigments, is known to enhance flavor and aroma. The present chamber 140 has been observed in testing to produce superior browning of pies, for example, when compared to that achieved using standard ovens. Not only is browning more even, but flavor and aroma is enhanced. It is believed that the smaller confines and relatively sealed conditions of chamber 140 produce this effect. Liquids in the food are not lost or dispersed but are retained to be absorbed by the sugars in the food item and slow the gelatinization process to become lighter and more tender.

To use stove 70 for baking, a food item such as a pie 182 is placed on rack 160 and lid 148 placed on body 144. Lid 148 is secured to base 146 using cables 154 and latches 156 are pivoted closed to pull lid 148 on tightly. A fire is started in body 72 using available fuel such as wood or dried dung by inserting the fuel through open fuel hatch 82 and adjusting lower air controller 80 and upper air controller 84. An optional hose 182 that preferably has flexible plastic portion 184 and a metal portion 186 can be used to increase airflow while the fuel is catching fire by blowing in plastic portion 186 while holding metal portion in holes 92, 94. Once the fire is burning evenly, support surface 116 can be put into position and baking chamber placed on top 118. Housing 142 is lowered over baking chamber 140 and first and second holes 176, 180, respectively, are brought into registration by rotating housing 142. Once holes 176 and 180 are aligned, thermometer 174 can be inserted. If the temperature reading on thermometer 174 is too low, fuel can be added and lower air controller 80 adjusted to produce a hotter flame. If the temperature is too high, lid 168 can be lifted for a few moments, water can be squirted on the fuel or lower air controller 80 adjusted to reduce the amount of air flowing into body 72. Combinations of these can be used to maintain the temperature inside baking chamber within a pre-selected range of temperatures.

Stove 70 can be disassembled into its components and bodies 72, 144, and 166 flattened in the same manner as body 12. Bodies 72, 144, 166, all have seams 190, 192 and 194 that are formed by interlocking folds formed in their respective edges. By squeezing bodies 72, 144, 166, these interlocking folds can be unlocked and separated. Once unlocked, bodies 72, 144, 166 may be pressed flat. Collars 90 and 120 can be unbolted and opened nearly flat. Thus, stove 70 can be stored in a relatively compact configuration for later use, easily re-assembled without tools and used again.

Figure 7:
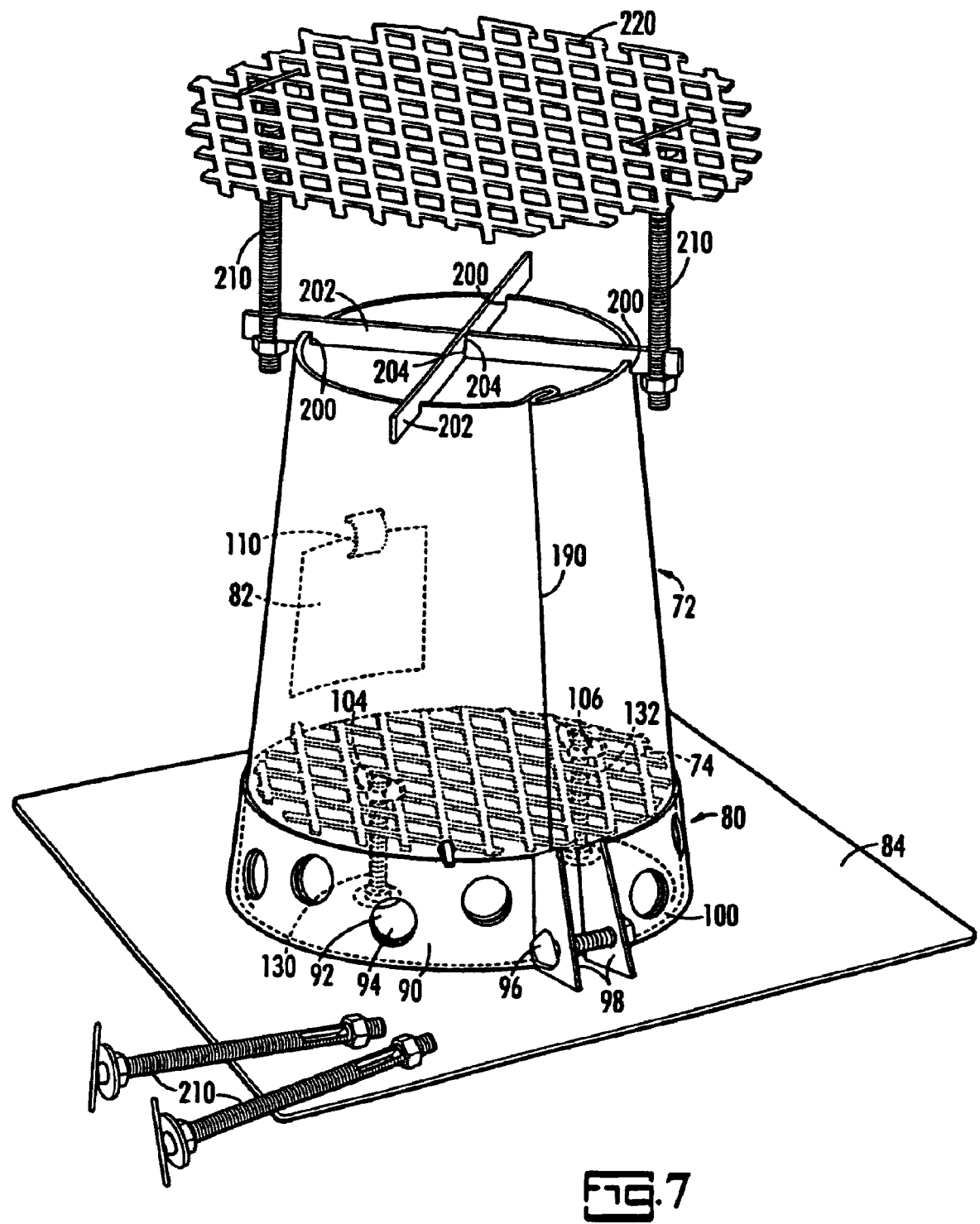
FIG. 7 is a perspective, partially exploded view of a stove having an alternative cooking surface configuration.

FIG. 7 illustrates another embodiment of the present invention whereby body 72 may be used to convey heat to the surface of a grilling surface 220. To achieve this configuration, slots 200 on support bridges 202 are first positioned to allow support bridges 202 to rest on the top edge of body 72. Support bridges 202 may be joined by their interlocking slots 204 to provide stability to the support structure for grilling surface 220. Bridges 202 may extend outside the perimeter of the top surface of body 72. On the ends of support bridges 202, slotted elevating bolts 210 can be positioned, with the ends of bridges 202 being received into the slots of slotted elevating bolts 210, to provide elevated support for grilling surface 220 above body 72.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art of lamp manufacture from the foregoing description of the preferred embodiments without departing from the spirit or scope of the present invention.

What is claimed is:

1. A stove, comprising:
   a frusto-conical body having a smaller top opening and a larger bottom opening;
   a fuel support grid carried within said frusto-conical body;
   a cook surface carried on said top opening, said top opening being formed to define tabs between which exhaust gases exit, said cook surface being carried on said tabs of said top opening; and
   means for elevating said frusto-conical body so as to admit a draft of air into said frusto-conical body through said bottom opening, pass through said fuel support grid and exit said top opening.

2. The stove of claim 1, wherein said frusto-conical body has an opening formed therein between said fuel support grid and said top opening, and wherein said stove further comprises a hatch covering said opening, said hatch being adapted to be lifted to insert fuel through said opening for placement onto said fuel support grid, wherein said elevating means further comprises at least three rods, and wherein said frusto-conical body has at least three holes formed therein between said fuel support grid and said bottom opening, said at least three holes being dimensions for receiving said at least three rods so that said at least three rods can be inserted partially into said at least three holes toward and into said fuel support grid whereby said at least rods extend laterally and rigidly from said frusto-conical body in order to elevate said frusto-conical body and admit said draft of air, said rods being movable inward as desired to adjust the height of the stove and thus adjust the draft and rate of combustion.

3. The stove of claim 1, wherein said cook surface has an edge and wherein a hole is formed therein near said edge for use in lifting said cook surface 16 when said cook surface is hot.

4. The stove of claim 1, further comprising a baking chamber carried by said cook surface.

5. A stove, comprising:
   a frusto-conical body having a smaller top opening and a larger bottom opening;
   a fuel support grid carried within said frusto-conical body;
   a cook surface carried on said top opening, said top opening being formed to define tabs between which exhaust gases exit, said cook surface being carried on said tabs of said top opening; and
   means for admitting a draft of air into said frusto-conical body, through said fuel support grid and out said top opening, wherein said elevating means further comprises at least three rods, and wherein said frusto-conical body has at least three holes formed therein between said fuel support grid and said bottom opening, said at least three holes being dimensions for receiving said at least three rods so that said at least three rods can be inserted partially into said at least three holes toward and into said fuel support grid whereby said at least rods extend laterally and rigidly from said frusto-conical body in order to elevate said frusto-conical body and admit said draft of air, said rods being movable inward as desired to adjust the height of the stove and thus adjust the draft and rate of combustion.

6. The stove of claim 5, wherein said frusto-conical body includes a first series of holes near said bottom opening and below said fuel support grid, and wherein said admitting means further comprises a collar encircling said frusto-conical body near said bottom opening below said fuel support grid, said collar having a second series of holes formed therein and being rotatable so that said first and said second series of holes can be placed more or less in registration to define an air passage into said frusto-conical body below said fuel support grid.

7. The stove of claim 5, wherein said cook surface further comprises:
   a grilling surface; and
   means for elevating said grilling surface above said top opening.

8. The stove of claim 7, wherein said elevating means further comprises:
   support bridges crossing said top opening of said frusto-conical body; and
   bolts carried by and extending upwards from said support bridges to which said grilling surface can be secured.

9. The stove of claim 5, further comprising a baking chamber carried on said cook surface.

10. The stove of claim 9, further comprising:
    a baking housing dimensioned to hold said baking chamber therein; and
    a support surface having a hole formed therein dimensioned for receiving a portion of said frusto-conical body, said baking housing resting on said support surface so that said portion of said frusto-conical body extends into said baking housing.

11. The stove as recited in claim 9, wherein said baking chamber is made of copper.

12. The stove as recited in claim 9, further comprising a thermometer insertable into said baking chamber and readable outside said baking chamber.

13. The stove of claim 9, wherein said baking chamber further comprises:
    means for sealing said chamber; and
    means for adjustably positioning food vertically within said chamber.

14. The stove of claim 13, wherein said means for sealing said baking chamber includes plural latches.

15. The stove of claim 13, wherein said means for sealing said baking chamber includes a gasket.

16. The stove of claim 5, wherein said frusto-conical body has an opening formed therein between said fuel support grid and said top opening, and wherein said stove further comprises a hatch covering said opening, said hatch being adapted to be lifted to insert fuel through said opening for placement onto said fuel support grid.

17. The stove of claim 5, wherein said frusto-conical body is formed of a sheet of metal having a first edge and an opposing second edge, said first and said second edges being folded complementarily so that said folds interleave to define said frusto-conical shape but also to release said folds to open said housing when said housing is squeezed.

18. The stove of claim 5, wherein said hatch has a top edge and is secured by said top edge to said frusto-conical body by a hinge and wherein said hinge is dimensioned to allow said top edge of said hatch to hold said hatch in an opened position to allow fuel to be placed on said fuel support grid.

19. The stove as recited in claim 5, further comprising a tube for augmenting air flow admitted into said frusto-conical body.

\* \* \* \* \*

UNITED STATES PATENT AND TRADEMARK OFFICE
CERTIFICATE OF CORRECTION

PATENT NO. : 7,107,983 B1
APPLICATION NO. : 11/059904
DATED : September 19, 2006
INVENTOR(S) : Jeffrey C. West It is certified that error appears in the above-identified patent and that said Letters Patent is hereby corrected as shown below:

Claim 1 (column 6, lines 15-27) should read as follows:

1. A stove, comprising:
    a frusto-conical body having a smaller top opening a larger bottom opening;
    a fuel support grid carried within said frusto-conical body;
    a cook surface carried on said top opening, said top opening being formed to define tabs between which exhaust gases exit, said cook surface being carried on said tabs of said top opening;
    and means for elevating said frusto-conical body so as to admit a draft of air into said frusto-conical body through said bottom opening, pass through said fuel support grid and exit said top opening, and
    wherein said elevating means further comprises at least three rods, and wherein said frusto-conical body has at least three holes formed therein between said fuel support grid and said bottom opening, said at least three holes being dimensions for receiving said at least three rods so that said at least three rods can be inserted partially into said at least three holes toward and into said fuel support grid whereby said at least rods extend laterally and rigidly from said frusto-conical body in order to elevate said frusto-conical body and admit said draft of air, said rods being movable inward as desired to adjust the height of the stove and thus adjust the draft and rate of combustion.

Claims 2 (column 6, lines 28-33) and 5 (column 6, lines 52-67 and column 7, lines 1-8) should read as follows:

2. The stove of claim 1, wherein said frusto-conical body has an opening formed therein between said fuel support grid and said top opening, and wherein said stove further comprises a hatch covering said opening, said hatch being adapted to be lifted to insert fuel through said opening for placement onto said fuel support grid.

5. A stove, comprising:
    a frusto-conical body having a smaller top opening and a larger bottom opening;
    a fuel support grid carried within said frusto-conical body;
    a cook surface carried on said top opening, said top opening being formed to define tabs between which exhaust gases exit, said cook surface being carried on said tabs of said top opening;
    and means for admitting a draft of air into said frusto-conical body, through said fuel support grid and out said top opening; and

UNITED STATES PATENT AND TRADEMARK OFFICE
CERTIFICATE OF CORRECTION

| | | |
|---|---|---|
| PATENT NO. | : 7,107,983 B1 | |
| APPLICATION NO. | : 11/059904 | |
| DATED | : September 19, 2006 | |
| INVENTOR(S) | : Jeffrey C. West | |

It is certified that error appears in the above-identified patent and that said Letters Patent is hereby corrected as shown below:

wherein said elevating (admitting) means further comprises at least three rods, and wherein said frusto-conical body has at least three holes formed therein between said fuel support grid and said bottom opening, said at least three holes being dimensions for receiving said at least three rods so that said at least three rods can be inserted partially into said at least three holes toward and into said fuel support grid whereby said at least rods extend laterally and rigidly from said frusto-conical body in order to elevate said frusto-conical body and admit said draft of air, said rods being movable inward as desired to adjust the height of the stove and thus adjust the draft and rate of combustion.

Claims 10 (column 7, lines 31-39), 11, 12, 13, 14 and 15 (column 8, lines 1-15) should read as follows:

10. The stove of claim 9, wherein said baking chamber further comprises: means for sealing said chamber; and means for adjustably positioning food vertically within said chamber.

11. The stove of claim 9, further comprising: a baking housing dimensioned to hold said baking chamber therein; and a support surface having a hole formed therein dimensioned for receiving a portion of said frusto-conical body, said baking housing resting on said support surface so that said portion of said frusto-conical body extends into said baking housing.

12. The stove of claim 10, wherein said means for sealing said baking chamber includes plural latches.

13. The stove of claim 10, wherein said means for sealing said baking chamber includes a gasket.

14. The stove as recited in claim 9, wherein said baking chamber is made of copper.

UNITED STATES PATENT AND TRADEMARK OFFICE
CERTIFICATE OF CORRECTION

PATENT NO. : 7,107,983 B1
APPLICATION NO. : 11/059904
DATED : September 19, 2006
INVENTOR(S) : Jeffrey C. West It is certified that error appears in the above-identified patent and that said Letters Patent is hereby corrected as shown below:

15. The stove as recited in claim 9, further comprising a thermometer insertable into said baking chamber and readable outside said baking chamber.

Signed and Sealed this

Twenty-fourth Day of June, 2008

JON W. DUDAS
*Director of the United States Patent and Trademark Office*